May 20, 1930.  E. CARNS  1,758,999
DISPENSING DEVICE
Filed Aug. 6, 1929
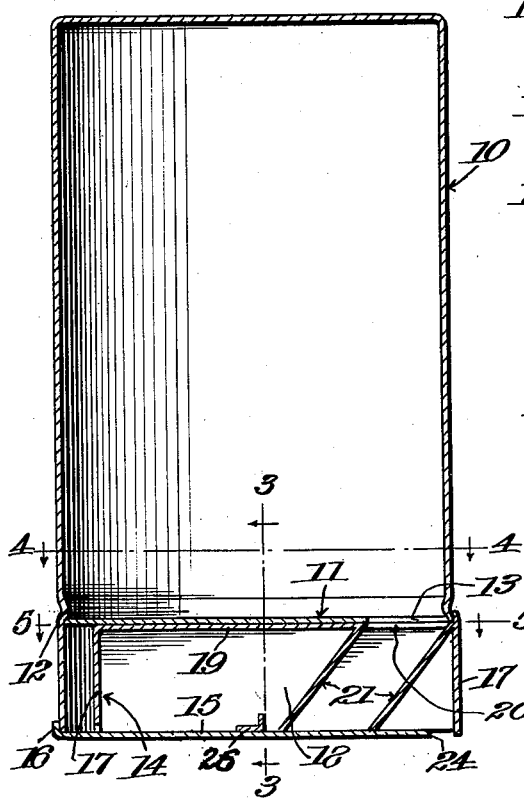
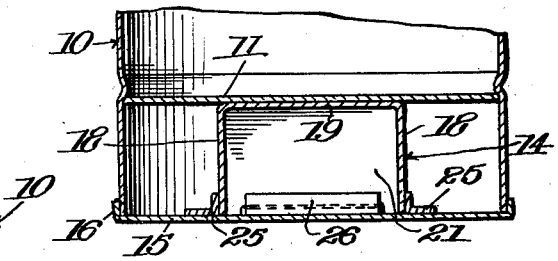
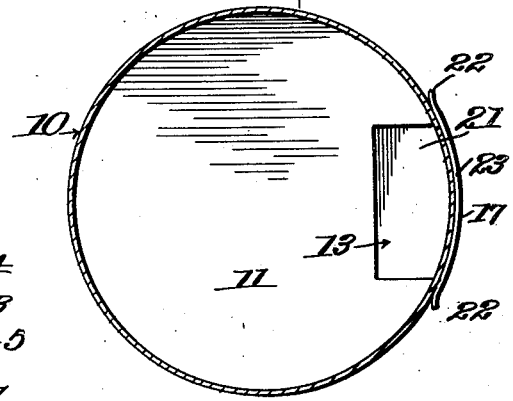
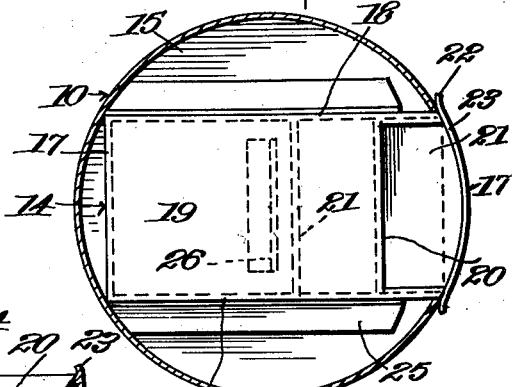
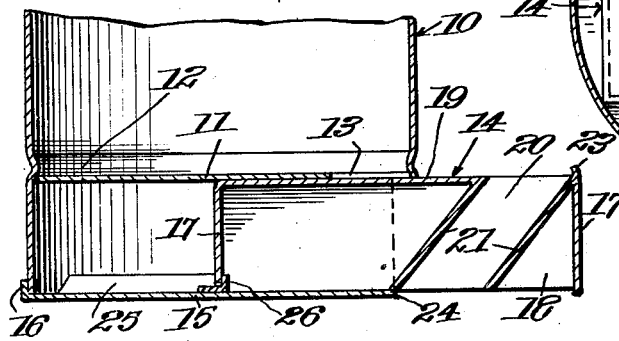
INVENTOR
Elliott Carns,
BY
ATTORNEY.

Patented May 20, 1930

1,758,999

UNITED STATES PATENT OFFICE

ELLIOTT CARNS, OF NEW YORK, N. Y.

DISPENSING DEVICE

Application filed August 6, 1929. Serial No. 383,880.

This invention relates to a non-reusable, accurate dispensing container adapted to be sold with a supply of ground coffee, or other food product or commodity, therein.

An important object of the invention is to produce a measuring means which is accurate so that for each operation, it will dispense a similar amount, which is essential in the making of coffee, the quantity dispensed being proportioned to a cup or other medium.

It is further aimed to provide a construction which may be produced practically as inexpensively as the ordinary coffee can or other container, so as not to add to the ultimate cost which the consumer would be required to bear, and to provide such a container as may be sealed or closed by usual machinery used in the making of coffee or equivalent cans, which feature greatly aids in maintaining the cost of production at a minimum.

Another important object is to provide a novel dispenser member which is capable of closing without causing discharge of the contents of the can, in which the top is closed so as to prevent the can contents from accidentally reaching the moving parts, which is open at the bottom so as to provide scraping edges to dislodge and eject any material which would ordinarily bind the parts, and to provide a construction of dispenser element in which the walls forming the measuring chamber are inclined with a view to attaining the objects aforesaid.

Another object is to provide a novel construction in which the opening movement of the dispenser member is limited by a stop and a construction in which an agitator is avoided and the dispensing opening of the container proper is located eccentrically or adjacent the margin of the partition.

The present construction provides a can which will keep coffee or other contents as well as a vacuum can up to the time the can is opened and which will preserve such contents, as a vacuum can will not do, after the can is opened.

Various additional objects and advantages will become apparent from a consideration of the description following, taken in connection with accompanying drawings illustrating an operative embodiment.

Referring to said drawings:—

Figure 1 is a central vertical sectional view through a canister constructed in accordance with my invention.

Figure 2 is a fragmentary view showing the lower portion of Figure 1 with the dispensing member in dispensing position as contrasted with the closed position shown in Figure 1.

Figure 3 is a vertical sectional view taken on the line 3—3 of Figure 1.

Figure 4 is a horizontal sectional view taken on the line 4—4 of Figure 1 and

Figure 5 is a horizontal sectional view taken on the line 5—5 of Figure 1.

As best shown in Figure 1, the article comprises a container 10 which may be of any desired size, shape or material. For example, it may be cylindrical and constructed from tin or other metal. Initially, the lower end of the container 10 is open. In the course of manufacture, the container is either first filled through the lower open end or a partition disk 11 is inserted through said lower end and marginally soldered or otherwise secured against an inwardly struck bead 12 on the peripheral wall of the container 10. Said disk 11 has a substantially rectangular dispensing opening at 13 and when the disk is applied before the can 10 receives its contents, such contents may be supplied through the opening 13.

After the container 10 is filled and the disk 11 is in place, a dispensing member generally designated 14 is disposed below the disk 11 and is supported and held in place by a bottom wall or closure disk 15, the latter being secured to the container 10 in any suitable manner as by soldering a flange 16 thereto.

Reverting to the dispensing member 14, the same is slidable and is substantially of inverted box shape, being closed at the ends and sides which are respectively designated 17 and 18, being open at the bottom and closed at the top as at a wall 19. Such dispensing member, however, is open at the top as at 20 to provide an inclined measuring and discharge chute 20, having inclined walls 21 at the front and rear thereof. The front end wall 17 is preferably curved in conformity with the cylinder and it has ears 22 at the ends and a flange 23 at the top, for engagement by the fingers to facilitate manipulation. The cylindrical wall of the container 10 is cut away at a portion thereof, as shown, to accommodate the movement of the dispensing member. Adjacent such opening, the disk 15 is cut away along a straight line 24, parallel with the longer edges of the walls 21 and opening or port 13.

The bottom wall 15 has guide members 25 of angle form, soldered or otherwise secured thereto, between and with which the side walls 18 of the dispensing member are located and engaged. Also soldered to the wall 15, is an angle member forming a stop 26, for engagement by the rear wall 17 to limit projection or movement of the dispensing member to the dispensing position shown in Figure 2. In the course of manufacture, the angle members 25 and 26 are fastened to the bottom wall 15 before the latter is soldered to the cylinder 10.

As previously intimated, the chute 20 is adapted to receive and dispense the same quantity of ground coffee or the like, each time it is moved outwardly, which amount is proportioned to the cup or other quantity of water used in order that the desired cup quality will be insured. The container is adapted to be closed by the usual machinery and comprises such simple and inexpensive parts that it can be made practically as cheap as ordinary containers and at least can be sold containing coffee of the same grade as existing containers without necessitating an additional cost being borne by the consumer.

When the dispensing member is retracted as in Figure 1, being so maintained by the frictional contact of the same with the disks 11 and 15, a supply of coffee will gravitate or fall into the chute 20. If the coffee or material is not free flowing, the container may be jarred which will cause the chute 20 to instantly fill. This result is attained by reason of the fact that the opening 13 is arranged away from the center, since the container is of a type avoiding the use of an agitator. If the opening 13 were centrally arranged, the coffee or material would simply pack for the most part, and not freely flow.

It will be understood that with the device arranged over the cup or the like, the dispensing member may be manually pulled outwardly from the position shown in Figure 1 to that shown in Figure 2 where the measured quantity contained by the chute 20 will fall or gravitate into the cup. The same quantity of material will be dispensed, each time the dispensing member is returned to normal position shown in Figure 1 and then moved outwardly to the dispensing position as shown in Figure 2, being limited in its movement to the latter position by stop 26. The wall 19 prevents the coffee or material falling onto the guide members 25 or onto any of the parts which would affect the free sliding movement of the dispensing member. Should any of the material reach the disk 15 or parts attached thereto, the same would be scraped by the walls engaging the same, particularly by the lower edges of walls 21, whereby it would first be moved inwardly and then outwardly and discharged as the dispensing member is opened. The inclination of the walls 21 enables the chute 20 to fully close upon the dispensing member being moved inwardly, before it starts to refill by material passing through the port 13. Also the construction is non-reusable, since it cannot be refilled without mutilating the parts.

Various changes may be resorted to provided they fall within the spirit and scope of the invention as defined by appended claims.

I claim as my invention:—

1. A dispensing device of the class described, having a body provided with spaced walls, a dispensing member movable between said walls and having an inclined measuring space, the innermost wall having an eccentric opening adapted to register with said space in the closed position of the dispensing member, and the other wall closing said space in the last mentioned position, said dispensing member being movable outwardly to a position where said space may discharge, said dispensing member having a wall at its top rearwardly of said space to close the eccentric opening when the dispensing member is projected.

2. A dispensing device of the class described having a body provided with spaced walls, the innermost wall having an opening therethrough, a dispensing member movable between the walls having a space to register with said opening, guide means for said dispensing member extending from one of said walls, and said dispensing member being movable to a position where said dispensing member may discharge through said space, said dispensing member having a wall at its top rearwardly of said space to close said opening when the dispensing member is projected.

3. A dispensing device of the class described having a body provided with spaced walls, the innermost wall having an opening therethrough, a dispensing member movable between the walls having a space to register with said opening, guide means for said dispensing member extending from one of said walls, and said dispensing member being movable to a position where said dispensing member may discharge through said space, parallel inclined walls located at the front and rear of said space and adapted to wipe the outer wall in the movement of the dispensing member, and said dispensing member adjacent the top having a closed wall rearwardly of said space to close the opening of the inner wall when the dispensing member is projected.

4. A container of the class described comprising a container body initially open at one end, a partition disk within the container in spaced relation to said end, a bottom wall fastened to said open end, guide means fastened to the upper surface of said bottom wall, said partition wall having a discharge opening, and a dispensing member positioned between the partition and bottom wall in engagement with said guide members, said dispensing member having a measuring space adapted for registration with said opening when the dispensing member is in closed position.

5. A dispensing member for a device of the class described, said member being composed of relatively thin walls throughout and including side walls and a front wall, parallel inclined walls intermediate said side walls defining a measuring and dispensing space, and a wall extending rearwardly from the top of the innermost inclined wall serving as a cut-off plate for a container when the dispensing member is projected.

In testimony whereof I have affixed my signature.

ELLIOTT CARNS.